(12) United States Patent
Kutty et al.

(10) Patent No.: US 10,243,859 B2
(45) Date of Patent: Mar. 26, 2019

(54) COMMUNICATIONS-CAPABILITY-BASED SDN CONTROL SYSTEM

(71) Applicant: Dell Products L.P., Round Rock, TX (US)

(72) Inventors: Ajan Daniel Kutty, Austin, TX (US); Marcelo Benetti DeSouza, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/603,105

(22) Filed: May 23, 2017

(65) Prior Publication Data

US 2018/0343203 A1  Nov. 29, 2018

(51) Int. Cl.
*H04L 12/66* (2006.01)
*H04L 12/801* (2013.01)
*H04L 12/861* (2013.01)

(52) U.S. Cl.
CPC .......... *H04L 47/19* (2013.01); *H04L 49/9005* (2013.01)

(58) Field of Classification Search
CPC ......... H04L 45/64; H04L 45/38; H04L 45/42; H04L 45/02; H04L 41/12
See application file for complete search history.

(56) References Cited

U.S. PATENT DOCUMENTS 9,742,656 B2 *  8/2017  Zheng .................... H04L 45/38

* cited by examiner

*Primary Examiner* — Jamal Javaid
(74) *Attorney, Agent, or Firm* — Haynes and Boone, LLP

(57) ABSTRACT

A communications-capability-based SDN control system includes an SDN controller device coupled to first and second communication capability SDN switch devices. The SDN controller device sends the first communication capability SDN switch device a first SDN protocol communication including a first feature request message, and receives back a second SDN protocol communication including a first feature response message having first communications capability information about the first communication capability SDN switch device. The SDN controller device then determines a first communication capability of the first communication capability SDN switch device using the first communication capability information. The SDN controller device then performs, based on the first communication capability, first communication capability action(s) to cause a control result in the first communication capability SDN switch device that may also be caused in the second communication capability SDN switch device without performing the at least one first communication capability action.

20 Claims, 8 Drawing Sheets

COMMUNICATIONS-CAPABILITY-BASED SDN CONTROL SYSTEM

BACKGROUND

The present disclosure relates generally to information handling systems, and more particularly to the control of Software Defined Networking (SDN) information handling systems based on their communications capabilities.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, are used in computing networks in order to allow information to be transmitted between computing devices. In addition, many such computer networks are now utilizing Software Defined Networking (SDN) protocols such as the OPENFLOW® protocol, the Open Network Environment provided by CISCO® Systems of San Jose, Calif., United States, the network virtualization platform provided by VMWARE® of Palo Alto, Calif., United States, and/or other SDN protocols known in the art. Software Defined Networking is an approach to computing networking that allows network administrators to programmatically initialize, control, and manage network behavior dynamically via open interfaces and the abstraction of lower-level functionality. This is done primarily by decoupling/disassociating the systems that make decisions about where data traffic is sent (i.e., the control plane) from the underlying systems that forward data traffic to its destination (i.e., the data plane.) In networks operating according to SDN protocols, an SDN controller device manages or controls SDN switch devices to configure those SDN switch devices to route data traffic according to centralized rules, and the SDN switch devices route that data traffic according to those rules.

Conventional SDN networks typically include SDN switch devices that operate at different tiers of the SDN network, and SDN networks may include SDN switch devices that have differing communications capabilities (e.g., some SDN switch devices in the SDN network may include a first level of bandwidth and/or a first packet processing capability to process data packets at a first speed, while some SDN network may include a second level of bandwidth that is different than the first level of bandwidth, and/or a second packet processing capability to process data packets at a second speed that is different than the first speed.) For example, SDN networks may include an aggregation layer with SDN switch devices that have bandwidth and packet processing capabilities that are relatively higher than SDN switch devices provided in an edge layer of the SDN network. Such communications capability mismatching in SDN switch devices of an SDN network is even more common when the SDN network includes SDN switch devices from different vendors (e.g., because each vendor may utilize different hardware, software, and/or other components in their SDN switch devices.)

SDN switch devices in SDN networks may require a minimum level of communications capabilities (e.g., a capability to process packets at a minimum of 300 packets per second (pps)) in order to provide for efficient operation of the SDN network. For example, an SDN switch device that is not capable of processing packets at a minimum rate may be unable to process flow modifications, may be unable to respond to keep alive packets in a regular manner, and/or may be unable to perform a variety of other SDN control communications known in the art. In conventional SDN networks, when an SDN switch device does not include minimum communications capabilities, excessive SDN protocol communications overhead and unstable connections between the SDN controller device and those SDN switch devices may occur. For example, when communicating with an SDN switch device with relatively low communications capabilities, the SDN controller device may be required to repeatedly send flow information until those flows are properly installed in the SDN switch device, repeatedly re-instantiate connections to the SDN switch device (e.g., tearing down and re-establishing the connection), and/or perform other actions that would be apparent to one of skill in the art in possession of the present disclosure. Such issues stem from the fact that SDN protocols tend to take a reactive approach to issues in the SDN network by simply operating to repair flows and/or flow sessions after problems result from SDN switch devices having poor communications capabilities.

Accordingly, it would be desirable to provide an improved SDN control system.

SUMMARY

According to one embodiment, an Information Handling System (IHS) includes a communication subsystem; a processing system that is coupled to the communication subsystem; and a memory system that is coupled to the processing system and that includes instructions that, when executed by the processing system, cause the processing system to provide a Software Defined Networking (SDN) controller engine that is configured to: send, through the communication subsystem to a first communication capability SDN switch device, a first SDN protocol communication including a first feature request message; receive, through the communication subsystem from the first communication capability SDN switch device, a second SDN protocol communication including a first feature response message having first communications capability information about the first communication capability SDN switch device; determine, using the first communication capability information, a first communication capability of the first communication capability SDN switch device; perform, based on the first communication capability determined for the first communication capability SDN switch device, at least one first communication capability action to cause a control result in the first communication capability SDN switch device; and cause the control result in a second communication capability SDN switch device that is different than the first communication capability SDN switch device without performing the at least one first communication capability action.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
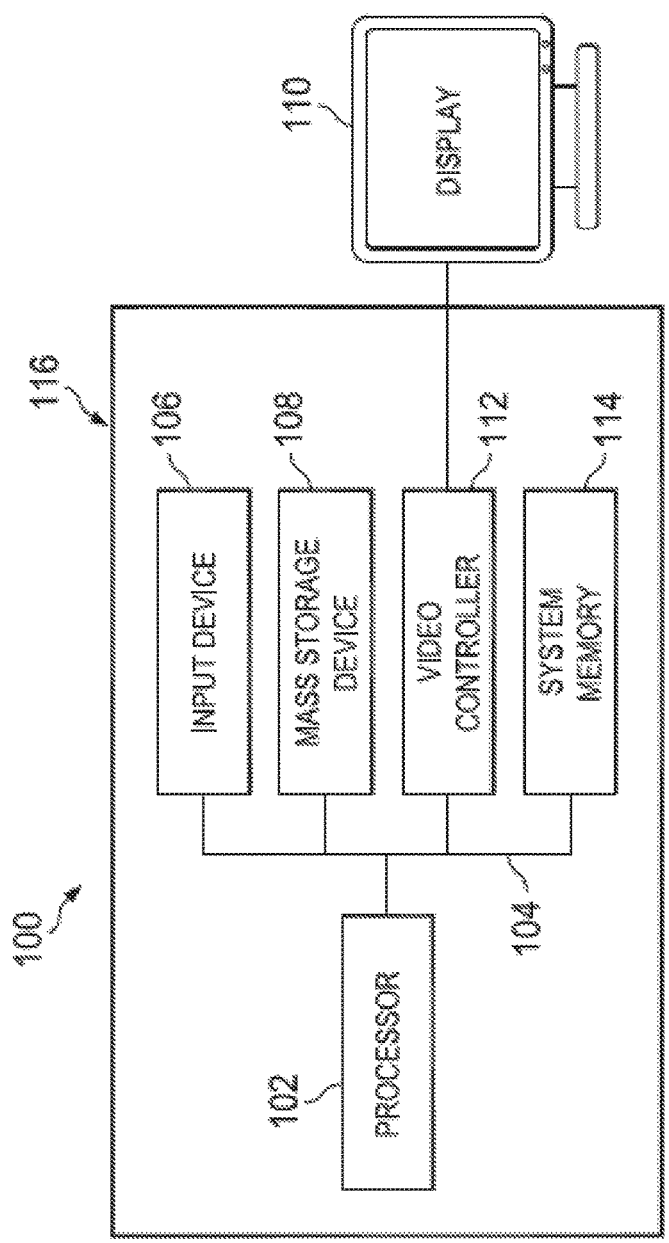
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
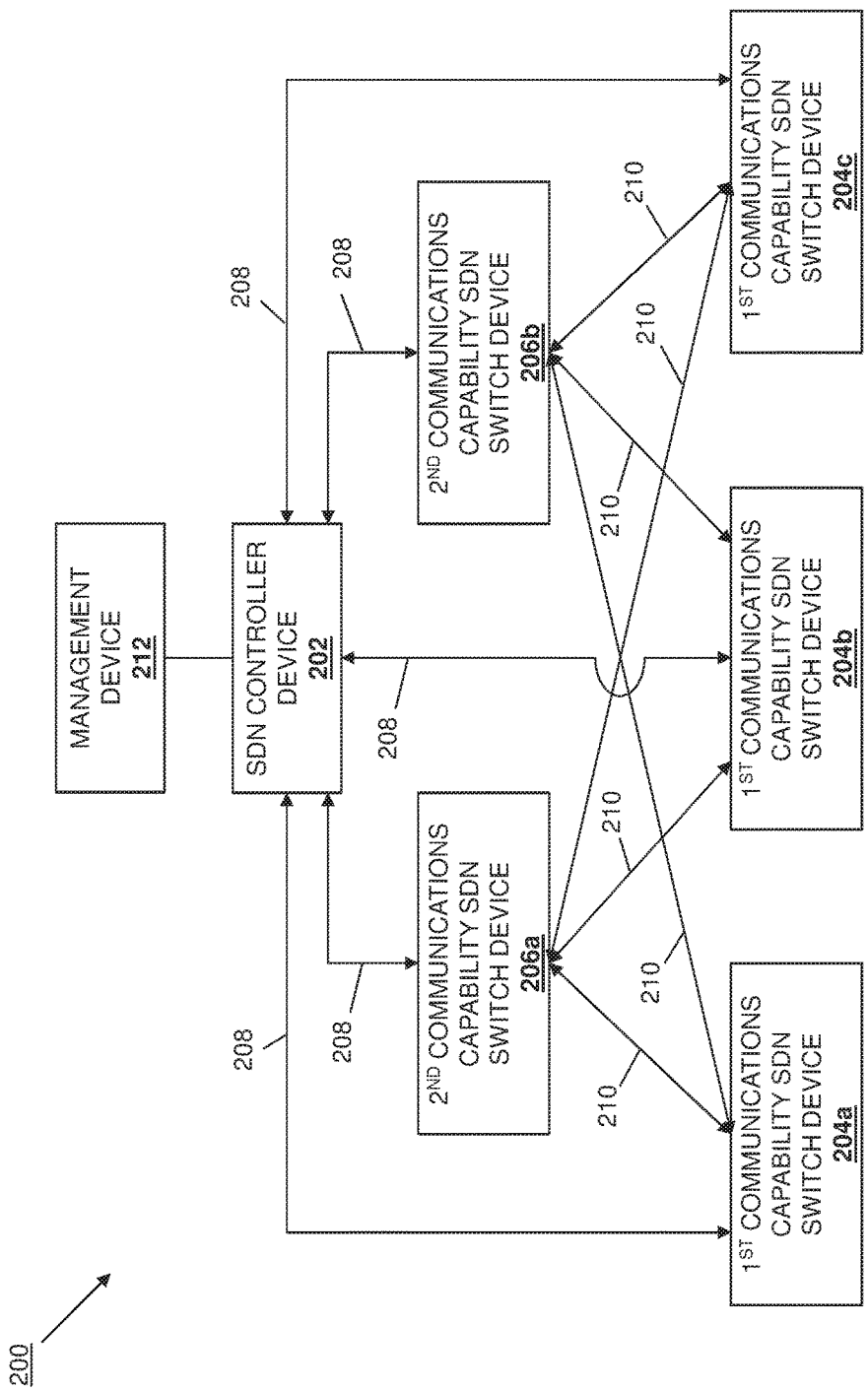
FIG. 2 is a schematic view illustrating an embodiment of a communications-capability-based SDN control system.

Referring now to FIG. 2, an embodiment of a communications-capability-based Software Defined Networking (SDN) control system 200 is illustrated. In the illustrated embodiment, the communications-capability-based SDN control system 200 includes an SDN controller device 202. While only a single SDN controller device is illustrated in the communications-capability-based SDN control system, one of skill in the art in possession of the present disclosure will recognize that network fabrics may include many more SDN controller devices, and the inclusion of additional SDN controller devices in the communications-capability-based SDN control system 200 that operate similarly to the SDN controller device 202 will fall within the scope of the present disclosure as well. In an embodiment, the SDN controller device 202 may be the IHS 100 discussed above with reference to FIG. 1, and/or may include some or all of the components of the IHS 100. In the specific embodiments discussed below, the SDN controller device 202 is provided by a computing device that is configured to communicate via the OPENFLOW® protocol, although the use of other SDN protocols (e.g., the Open Network Environment provided by CISCO® Systems of San Jose, Calif., United States; the network virtualization platform provided by NICIRA®/VMWARE of Palo Alto, Calif., United States; and/or other SDN protocols known in the art) will fall within the scope of the present disclosure as well.

In the illustrated embodiment, the SDN controller device 202 is coupled to a plurality of SDN switch devices that include a plurality of first communications capability SDN switch devices 204a, 204b, and 204c, and a plurality of second communications capability SDN switch devices 206a and 206b. For example, the SDN controller device 202 may be coupled to each of the first communications capability SDN switch devices 204a-c and second communications capability SDN switch devices 206a-b by management/control connections 208, while each of the first communications capability SDN switch devices 204a-c and second communications capability SDN switch devices 206a-b may be coupled together by data connections 210. FIG. 2 provides an example of an SDN network fabric including first communications capability SDN switch devices 204a-c in an edge layer, and second communications capability SDN switch devices 206a-b in an aggregation layer, although other configurations of different communications capability SDN switch devices will fall within the scope of the present disclosure as well.

While only two sets of different communications capability SDN switch device are illustrated in the communications-capability-based SDN control system 200, one of skill in the art in possession of the present disclosure will recognize that network fabrics may include more different capability switch devices, within or across different layers of the SDN network fabric, and the inclusion of additional different capability SDN switch devices in the communications-capability-based SDN control system 200 that operate similarly to the first communications capability SDN switch devices 204*a-c* and second communications capability SDN switch devices 206*a-b* will fall within the scope of the present disclosure as well. In an embodiment, any or all of the first communications capability SDN switch devices 204*a-c* and second communications capability SDN switch devices 206*a-b* may be the IHS 100 discussed above with reference to FIG. 1, and/or may include some or all of the components of the IHS 100. In the specific embodiments discussed below, the first communications capability SDN switch devices 204*a-c* and second communications capability SDN switch devices 206*a-b* are provided by switch devices that are configured to communicate via the OPENFLOW® protocol, although the use of other SDN protocols (e.g., the Open Network Environment provided by CISCO® Systems of San Jose, Calif., United States; the network virtualization platform provided by NICIRA®/VMWARE of Palo Alto, Calif., United States; and/or other SDN protocols known in the art) will fall within the scope of the present disclosure as well.

In the illustrated embodiment, a management device 212 is coupled to the SDN controller device 202. In an embodiment, the management device 212 may be the IHS 100 discussed above with reference to FIG. 1, and/or may include some or all of the components of the IHS 100. In specific embodiments, the management device 212 may be provided by a desktop computing device, a laptop/notebook computing device, a tablet computing device, a mobile phone, and/or other management devices known in the art that are configured to provide management commands, display management information, and/or perform any of the other operations of the management devices discussed below. While a specific communications-capability-based SDN control system has been illustrated and described, one of skill in the art in possession of the present disclosure will recognize that a variety of different devices, device configurations, and/or device connections (other than those illustrated in FIG. 2) may be utilized to provide a communications-capability-based SDN control system that will benefit from the teachings of the present disclosure and thus fall within its scope as well.

Figure 3:
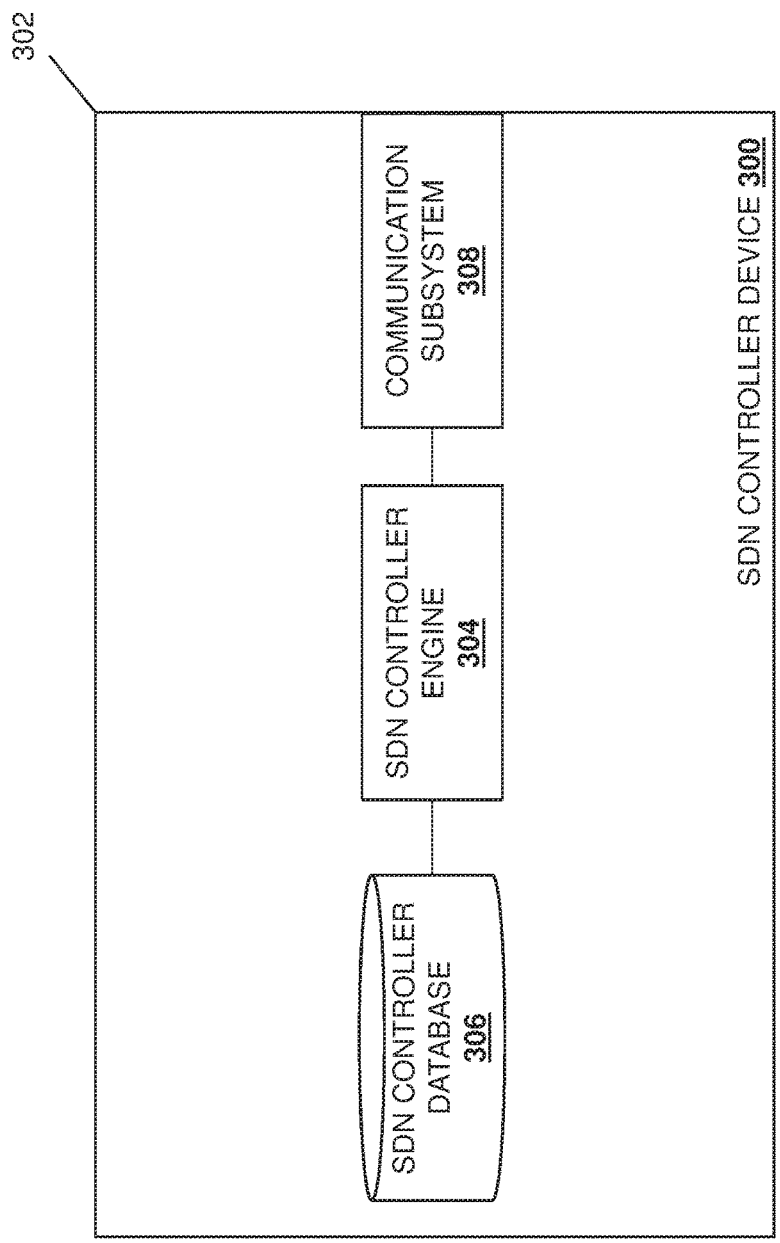
FIG. 3 is a schematic view illustrating an embodiment of an SDN controller device used in the communications-capability-based SDN control system of FIG. 2.

Referring now to FIG. 3, an embodiment of an SDN controller device 300 is illustrated that may be the SDN controller device 202 discussed above with reference to FIG. 2. As such, the SDN controller device 300 may be the IHS 100 discussed above with reference to FIG. 1, may include some or all of the components of the IHS 100, and in specific embodiments may be a computing device that is configured to communicate via the OPENFLOW® protocol, although the use of other SDN protocols (e.g., the Open Network Environment provided by CISCO® Systems of San Jose, Calif., United States; the network virtualization platform provided by NICIRA®/VMWARE of Palo Alto, Calif., United States; and/or other SDN protocols known in the art) will fall within the scope of the present disclosure as well. In the illustrated embodiment, the SDN controller device 300 includes a chassis 302 that houses the components of the SDN controller device 300, only some of which are illustrated in FIG. 3. For example, the chassis 302 may house a processing system (not illustrated, but which may include the processor 102 discussed above with reference to FIG. 1) and a memory system (not illustrated, but which may include the memory 114 discussed above with reference to FIG. 1) that includes instructions that, when executed by the processing system, cause the processing system to provide an SDN controller engine 304 that is configured to perform the functions of the SDN controller engines and SDN controller devices discussed below.

The chassis 302 may also house a storage device (not illustrated, but which may include the storage device 108 discussed above with reference to FIG. 1) that is coupled to the SDN controller engine 304 (e.g., via a coupling between the storage device and the processing system) and that includes an SDN controller database 306 that stores data and/or other information utilized to provide the functionality discussed below. The chassis 302 may also house a communication subsystem 308 that is coupled to the SDN controller engine 304 (e.g., via a coupling between the communication subsystem 308 and the processing system) and that may include a Network Interface Controller (NIC), a wireless communication device (e.g., a BLUETOOTH® wireless communication device, a Near Field Communication (NFC) device, a WiFi communication devices, and/or other wireless communication devices known in the art), and/or other communication components known in the art. In a specific embodiment, the communication subsystem 308 may include the ports utilized for providing the links to SDN switch devices and management devices discussed below. While a specific embodiment of an SDN controller device has been illustrated and described, one of skill in the art in possession of the present disclosure will recognize that SDN controller devices may include a variety of other components for providing conventional SDN controller device functionality, as well as the functionality discussed below, while remaining within the scope of the present disclosure.

Figure 4:
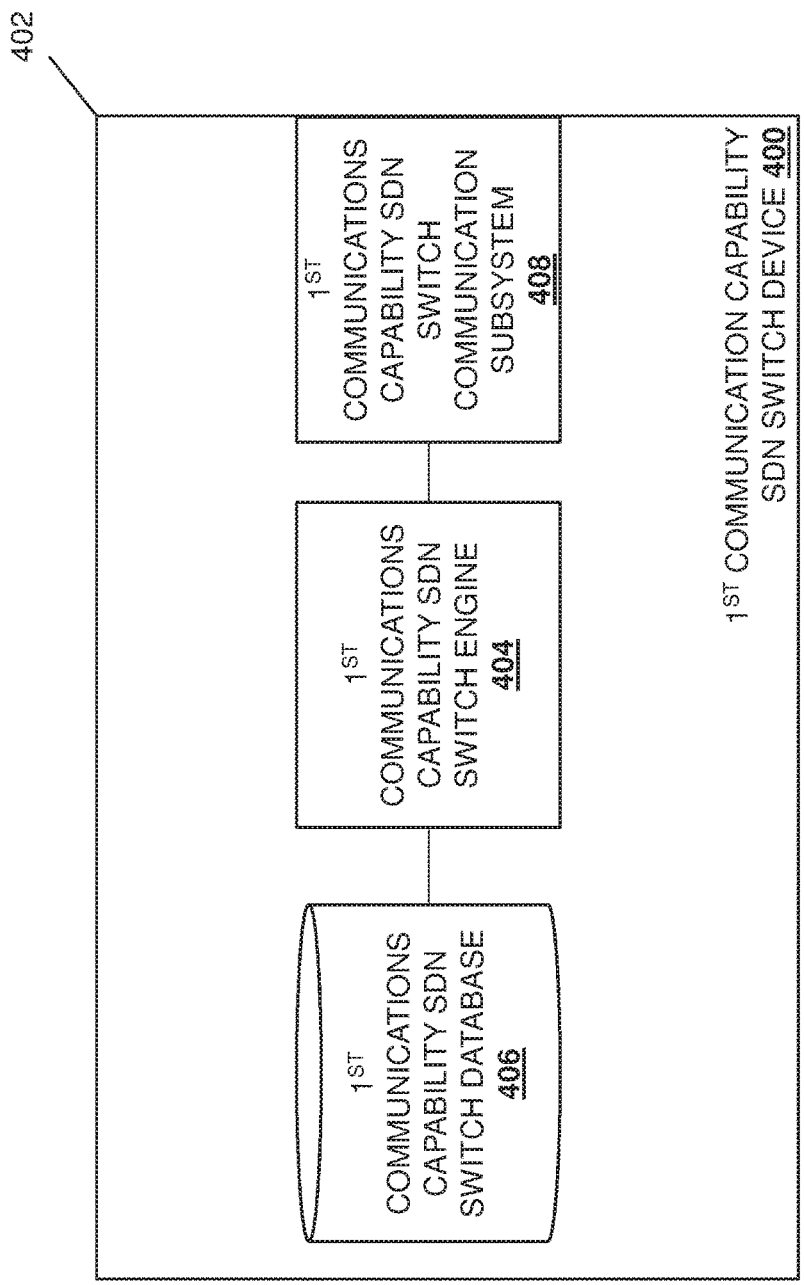
FIG. 4 is a schematic view illustrating an embodiment of a first communication capability SDN switch device used in the communications-capability-based SDN control system of FIG. 2.

Referring now to FIG. 4, an embodiment of a first communications capability SDN switch device 400 is illustrated that may be any or all of the first communications capability SDN switch devices 204*a-c* discussed above with reference to FIG. 2. As such, the first communications capability SDN switch device 400 may be the IHS 100 discussed above with reference to FIG. 1, may include some or all of the components of the IHS 100, and in specific embodiments may be a switch device that is configured to communicate via the OPENFLOW® protocol, although the use of other SDN protocols (e.g., the Open Network Environment provided by CISCO® Systems of San Jose, Calif., United States; the network virtualization platform provided by NICIRA®/VMWARE of Palo Alto, Calif., United States; and/or other SDN protocols known in the art) will fall within the scope of the present disclosure as well. In the illustrated embodiment, the first communications capability SDN switch device 400 includes a chassis 402 that houses the components of the first communications capability SDN switch device 400, only some of which are illustrated in FIG. 4. For example, the chassis 402 may house a processing system (not illustrated, but which may include the processor 102 discussed above with reference to FIG. 1) and a memory system (not illustrated, but which may include the memory 114 discussed above with reference to FIG. 1) that includes instructions that, when executed by the processing system, cause the processing system to provide a first communications capability SDN switch engine 404 that is configured to perform the functions of the first communications capability SDN switch engines and first communications capability SDN switch devices discussed below.

The chassis 402 may also house a storage system (not illustrated, but which may include the storage device 108 discussed above with reference to FIG. 1) that is coupled to the first communications capability SDN switch engine 404 (e.g., via a coupling between the storage device and the processing system) and that includes a first communications capability SDN switch database 406 that stores data and/or other information utilized to provide the functionality discussed below. The chassis 402 may also house a first communications capability SDN switch communication subsystem 408 that is coupled to the first communications capability SDN switch engine 404 (e.g., via a coupling between the first communications capability SDN switch communication subsystem 408 and the processing system) and that may include a Network Interface Controller (NIC), a wireless communication device (e.g., a BLUETOOTH® wireless communication device, a Near Field Communication (NFC) device, a WiFi communication devices, and/or other wireless communication devices known in the art), and/or other communication components known in the art. In a specific embodiment, the first communications capability SDN switch communication subsystem 408 may include the ports utilized for providing the links to the SDN controller device 202 and/or the second communications capability SDN switch devices 206a-b as discussed below.

In a specific embodiment, the processing system provided in the first communications capability SDN switch device 400 may be a first capability processing system that may include, for example, one or more first capability central processing units (CPUs), one or more first capability network processing units (NPUs), one or more first capability CPU/NPU channels (e.g., communications connections between the CPU and the NPU), and/or variety of other processing system components known in the art. Similarly, the memory system provided in the first communications capability SDN switch device 400 may be a first capability memory system that may include, for example, one or more first capability memory devices, one or more first capability memory channels (e.g., communication connections to the processing system), and/or variety of other memory system components known in the art. Similarly, the storage system provided in the first communications capability SDN switch device 400 may be a first capability storage system that may include, for example, one or more first capability storage devices, one or more first capability storage subsystems (e.g., communications connections to the processing system), and/or variety of other storage system components known in the art. Similarly, the first communications capability SDN switch communications subsystem 408 may be a first capability communications subsystem that includes one or more first capability communications components that connect the components of the first communications capability SDN switch device 400 to the rest of the communications-capability-based SDN control system.

As discussed in further detail below, any or all of the first capability processing system, the first capability memory system, the first capability storage system, and the first capability communications subsystem (as well as any other components in the first communications capability SDN switch device 400) may provide, at least in part, for a first communications capability in the first communications capability SDN switch device 400. For example, the first communications capability of the first communications capability SDN switch device 400 may result in a maximum bandwidth for communications transmitted or received by the first communications capability SDN switch device 400, an average bandwidth for communications transmitted or received by the first communications capability SDN switch device 400a, other bandwidth related characteristics of the first communications capability SDN switch device 400, a maximum packet processing speed for packets processed by the first communications capability SDN switch device 400, an average packet processing speed for packets processed by the first communications capability SDN switch device 400, other packet processing related characteristics for the first communications capability SDN switch device 400, as well as any other first capability communication characteristics for the first communications capability SDN switch device 400 that would be apparent to one of skill in the art in possession of the present disclosure.

In the examples below, the first communications capability of the first communications capability SDN switch devices 204a-c/400 is lower than a second communications capability of the second communications capability SDN switch devices 206a-b/500 (e.g., relatively lower bandwidth, relatively lower packet processing speed, etc.) However, one of skill in the art in possession of the present disclosure with recognize that relative communications capabilities between the SDN switch devices of the present disclosure may include different communications capabilities other than those specifically called out herein, and particular SDN switch devices may have some communications capabilities that are higher than other SDN switch devices, while having some communications capabilities that are lower than those same other SDN switch devices. While a specific embodiment of a first communications capability SDN switch device has been illustrated and described, one of skill in the art in possession of the present disclosure will recognize that first communications capability SDN switch devices may include a variety of other components for providing conventional SDN switch device functionality, as well as the functionality discussed below, while remaining within the scope of the present disclosure.

Figure 5:
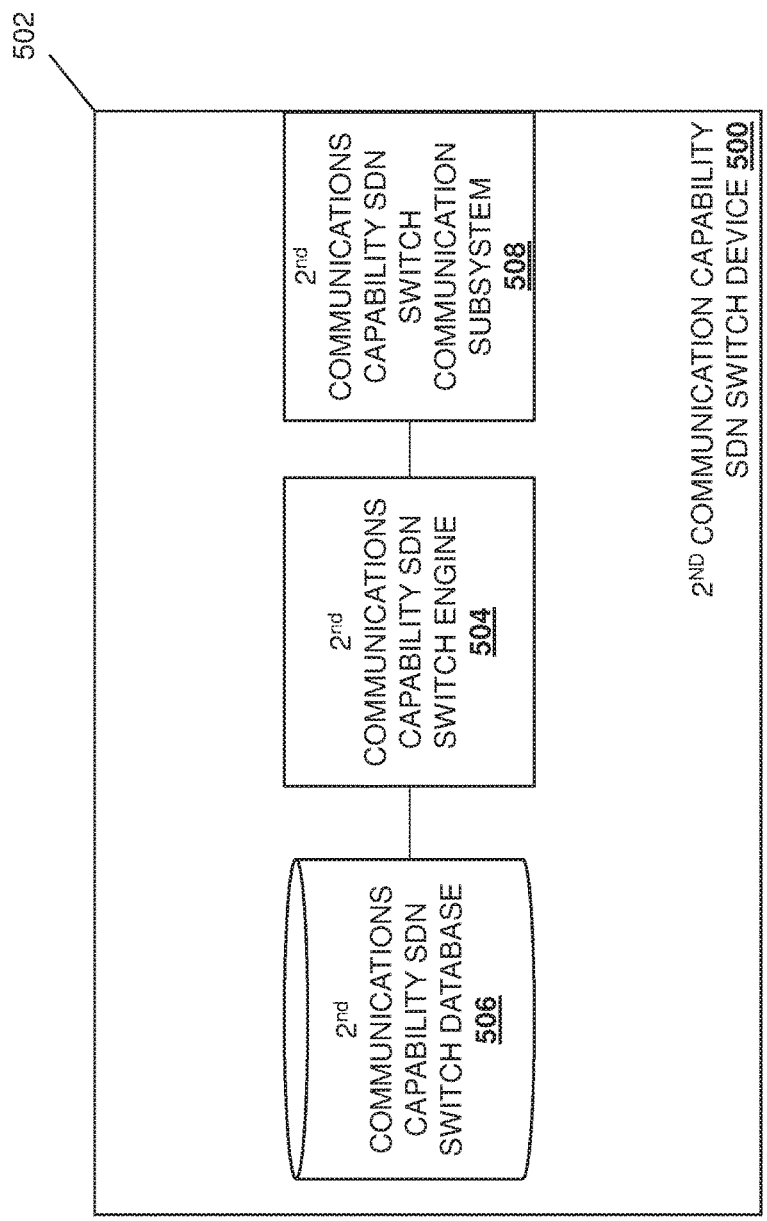
FIG. 5 is a schematic view illustrating an embodiment of a second communication capability SDN switch device used in the communications-capability-based SDN control system of FIG. 2.

Referring now to FIG. 5, an embodiment of a second communications capability SDN switch device 500 is illustrated that may be either or both of the second communications capability SDN switch devices 206a-b discussed above with reference to FIG. 2. As such, the second communications capability SDN switch device 500 may be the IHS 100 discussed above with reference to FIG. 1, may include some or all of the components of the IHS 100, and in specific embodiments may be a switch device that is configured to communicate via the OPENFLOW® protocol, although the use of other SDN protocols (e.g., the Open Network Environment provided by CISCO® Systems of San Jose, Calif., United States; the network virtualization platform provided by NICIRA®/VMWARE of Palo Alto, Calif., United States; and/or other SDN protocols known in the art) will fall within the scope of the present disclosure as well. In the illustrated embodiment, the second communications capability SDN switch device 500 includes a chassis 502 that houses the components of the second communications capability SDN switch device 500, only some of which are illustrated in FIG. 5. For example, the chassis 502 may house a processing system (not illustrated, but which may include the processor 102 discussed above with reference to FIG. 1) and a memory system (not illustrated, but which may include the memory 114 discussed above with reference to FIG. 1) that includes instructions that, when executed by the processing system, cause the processing system to provide a second communications capability SDN switch engine 504 that is configured to perform the functions of the second communications capability SDN switch engines and second communications capability SDN switch devices discussed below.

The chassis 502 may also house a storage system (not illustrated, but which may include the storage device 108 discussed above with reference to FIG. 1) that is coupled to the second communications capability SDN switch engine 504 (e.g., via a coupling between the storage device and the processing system) and that includes a second communications capability SDN switch database 506 that stores data and/or other information utilized to provide the functionality discussed below. The chassis 502 may also house a second communications capability SDN switch communication subsystem 508 that is coupled to the second communications capability SDN switch engine 504 (e.g., via a coupling between the second communications capability SDN switch communication subsystem 508 and the processing system) and that may include a Network Interface Controller (NIC), a wireless communication device (e.g., a BLUETOOTH® wireless communication device, a Near Field Communication (NFC) device, a WiFi communication devices, and/or other wireless communication devices known in the art), and/or other communication components known in the art. In a specific embodiment, the second communications capability SDN switch communication subsystem 508 may include the ports utilized for providing the links to the SDN controller device 202 and/or the first communications capability SDN switch devices 204a-c as discussed below.

In a specific embodiment, the processing system provided in the second communications capability SDN switch device 500 may be a second capability processing system that may include, for example, one or more second capability central processing units (CPUs), one or more second capability network processing units (NPUs), one or more second capability CPU/NPU channels (e.g., communications connections between the CPU and the NPU), and/or variety of other processing system components known in the art. Similarly, the memory system provided in the second communications capability SDN switch device 500 may be a second capability memory system that may include, for example, one or more second capability memory devices, one or more second capability memory channels (e.g., communication connections to the processing system), and/or variety of other memory system components known in the art. Similarly, the storage system provided in the second communications capability SDN switch device 500 may be a second capability storage system that may include, for example, one or more second capability storage devices, one or more second capability storage subsystems (e.g., communication connections to the processing system), and/or variety of other storage system components known in the art. Similarly, the second communications capability SDN switch communications subsystem 508 may be a second capability communications subsystem that includes one or more second capability communications components that connect the components of the second communications capability SDN switch device 500 to the rest of the communications-capability-based SDN control system.

As discussed in further detail below, the any or all of the second capability processing system, the second capability memory system, the second capability storage system, and the second capability communications subsystem (as well as any other components in the second communications capability SDN switch device 500) may provide, at least in part, for a second communications capability in the second communications capability SDN switch device 500. For example, the second communications capability of the second communications capability SDN switch device 500 may result in a maximum bandwidth for communications transmitted or received by the second communications capability SDN switch device 500, an average bandwidth for packets processed by the second communications capability SDN switch device 500, other bandwidth related characteristics for the second communications capability SDN switch device 500, a maximum packet processing speed for packets processed by the second communications capability SDN switch device 500, an average packet processing speed for packets processed by the second communications capability SDN switch device 500, other packet processing related characteristics for the second communications capability SDN switch device 500, as well as any other second capability communication characteristics for the second communications capability SDN switch device 500 that would be apparent to one of skill in the art in possession of the present disclosure.

In the examples below, the second communications capability of the second communications capability SDN switch devices 206a-b/500 is higher than the first communications capability of the first communications capability SDN switch devices 204a-c/400 (e.g., relatively higher bandwidth, relatively higher packet processing speed, etc.) However, as discussed above, one of skill in the art in possession of the present disclosure with recognize that relative communications capabilities between the SDN switch devices of the present disclosure may include different communications capabilities other than those specifically called out herein, and particular SDN switch devices may have some communications capabilities that are lower than other SDN switch devices, while having some communications capabilities that are higher than those same other SDN switch devices. While a specific embodiment of a second communications capability SDN switch device has been illustrated and described, one of skill in the art in possession of the present disclosure will recognize that second communications capability SDN switch devices may include a variety of other components for providing conventional SDN switch device functionality, as well as the functionality discussed below, while remaining within the scope of the present disclosure.

Figure 6:
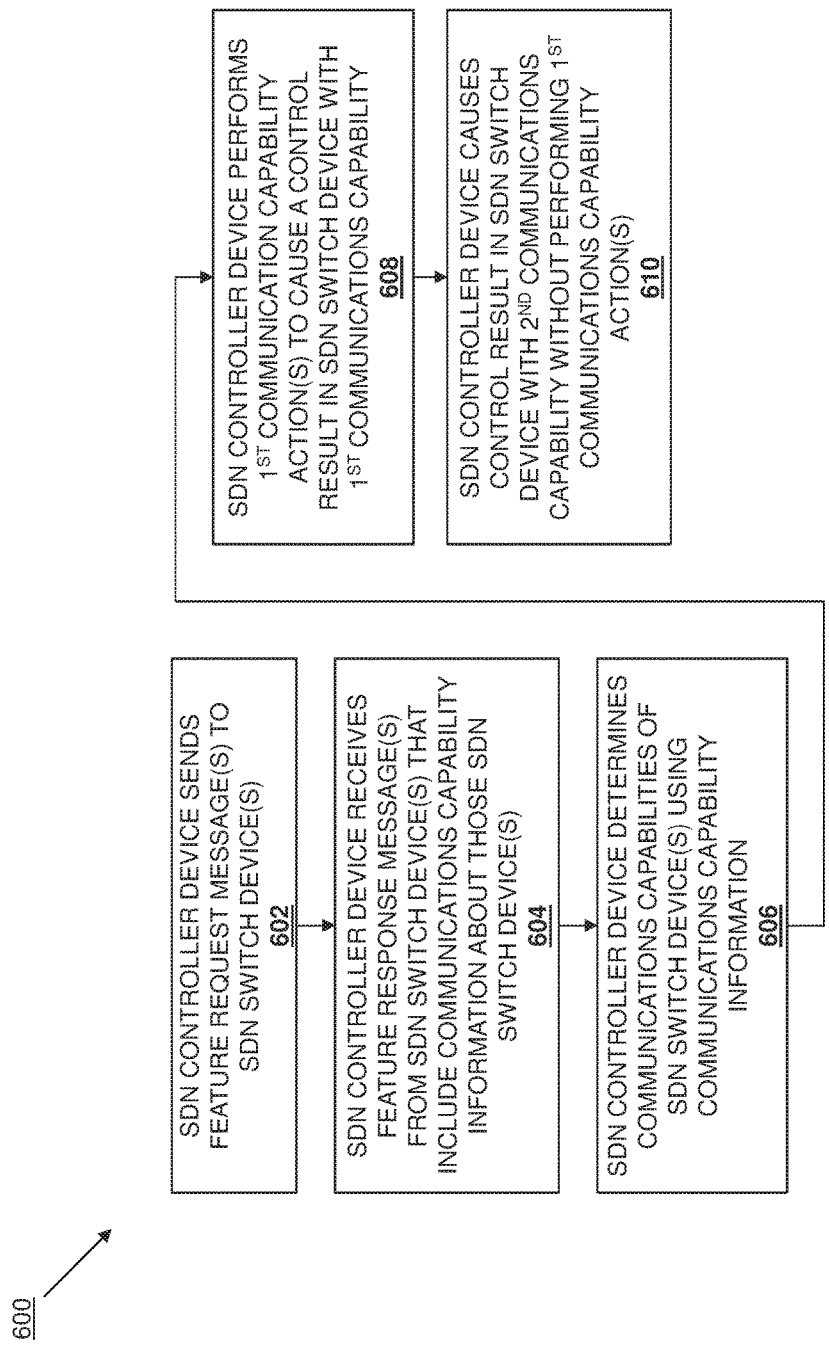
FIG. 6 is a flow chart illustrating an embodiment of a method for controlling an SDN network based on SDN switch device communication capability.

Referring now to FIG. 6, an embodiment of a method 600 for controlling an SDN network based on SDN switch device communication capability is illustrated. As discussed above, the systems and methods of the present disclosure provide for a proactive approach to control of SDN networks that is based on the exchange of the communications capabilities of SDN switch devices with SDN controller device(s), which allows the SDN controller device(s) to modify their communications with each SDN switch device based on the communications capabilities of each of those SDN switch devices. For example, SDN controller devices can limit the number of packets sent to switch devices based on the packet processing capabilities of those switch devices, send fewer keep alive packets to switch devices based on the packet processing capabilities of those switch devices, configure the size of buffers for links to switch devices in order to provide optimal congestion window sizes for switch devices based on the packet processing capabilities of those switch devices, "chunk" flow messages into flow message chunks and send complete-processing requests between flow message chunks based on the packet processing capabilities of those switch devices, and/or perform other functionality discussed below. Furthermore, one of skill in the art in possession of the present disclosure will recognize that the knowledge of the communications capability of SDN switch devices in the SDN network will provide the SDN controller device the ability to perform a variety of other customizations on SDN switch devices to improve the performance of the SDN network.

The method 600 begins at block 602 where an SDN controller device sends feature request message(s) to SDN switch device(s). In an embodiment, at block 602, the SDN controller engine 304 in the SDN controller device 202/300 may operate to send feature request message(s) through its communication subsystem 308 and over the management/control connections 208 to any of the first communications capability SDN switch devices 204a-c and/or the second communications capability SDN switch devices 206a-b. In the examples below, the SDN controller device 202 is discussed as providing feature request message(s) to the first communications capability SDN switch device 204a and the second communications capability SDN switch device 206a, but one of skill in the art in possession of the present disclosure will recognize that the SDN controller device 202 may communication at block 602 similarly with any, and in many embodiments will communicate with all, of the first communications capability SDN switch devices 204a-c and/or the second communications capability SDN switch devices 206a-b.

Figure 7:
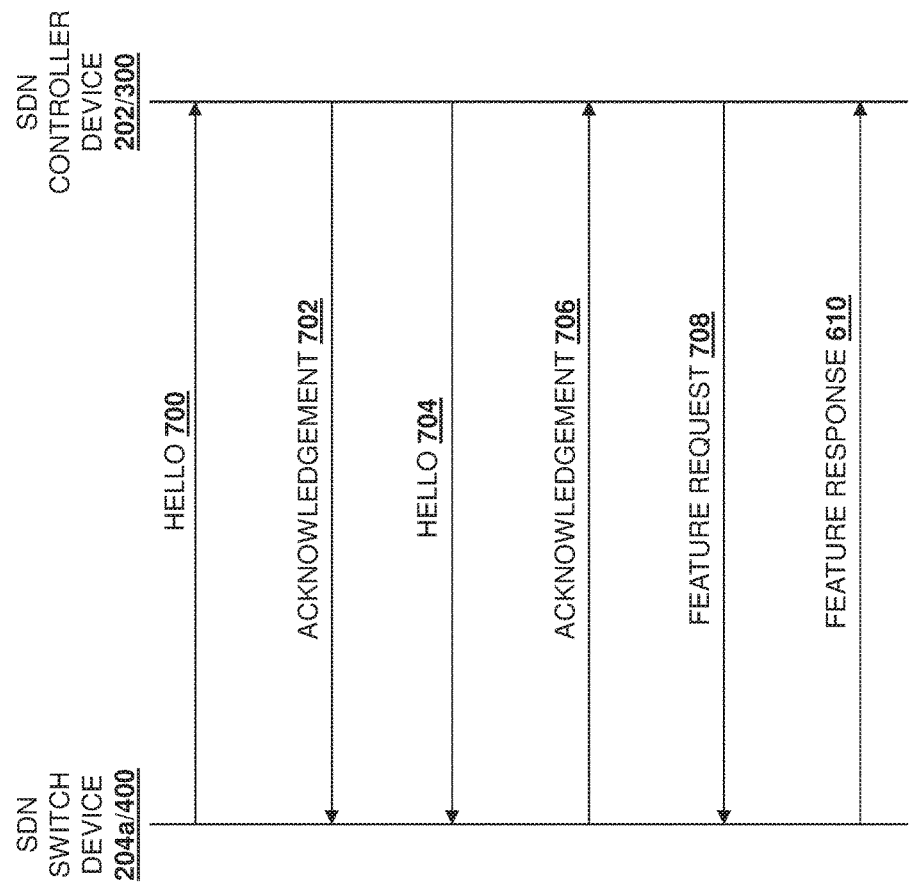
FIG. 7 is a swim diagram illustrating an embodiment of communications between an SDN switch device and an SDN controller device during the method of FIG. 6.

FIG. 7 illustrates a specific example of block 602 where, in response to the startup, reboot, and/or other initialization of the SDN controller device 202 and/or the first communications capability SDN switch device 204a, the SDN controller engine 304 in the SDN controller device 202/300 and the first communications capability SDN switch engine 404 in the first communications capability SDN switch device 204a/400 perform an initial handshake procedure that may include or be followed by the feature request message(s) sent by the SDN controller device 202 to the first communications capability SDN switch device 204a. For example, as illustrated in FIG. 7, the first communications capability SDN switch engine 404 in the first communications capability SDN switch device 204a/400 may use its first communications capability SDN switch communications subsystem 408 to send a "HELLO" message 700 through the management/control connection 208 to the SDN controller device 202/300, and the SDN controller engine 304 in the SDN controller device 202/300 may receive that "HELLO" message 700 via its communication subsystem 308. In response to receiving the "HELLO" message 700, the SDN controller engine 304 in the SDN controller device 202/300 may use its communication subsystem 308 to send an "ACKNOWLEDGEMENT" message 702 through the management/control connection 208 to the first communications capability SDN switch device 204a/400, and the first communications capability SDN switch engine 404 in the first communications capability SDN switch device 204a/400 may receive that "ACKNOWLEDGEMENT" message 702 through its first communications capability SDN switch communication subsystem 408.

Furthermore, the SDN controller engine 304 in the SDN controller device 202/300 may use its communications subsystem 308 to send a "HELLO" message 704 through the management/control connection 208 to the first communications capability SDN switch device 204a/400, and the first communications capability SDN switch engine 404 in the first communications capability SDN switch device 204a/400 may receive that "HELLO" message 704 via its communication subsystem 308. In response to receiving the "HELLO" message 704, the first communications capability SDN switch engine 404 in the first communications capability SDN switch device 204a/400 may use its first communications capability SDN switch communication subsystem 408 to send an "ACKNOWLEDGEMENT" message 706 through the management/control connection 208 to the SDN controller device 202/300, and the SDN controller engine 304 in the SDN controller device 202/300 may receive that "ACKNOWLEDGEMENT" message 706 through its communications subsystem 308. One of skill in the art in possession of the present disclosure will recognize that the discussion above with reference to FIG. 7 describes an OPENFLOW® initial handshake procedure, and that other types of handshake procedures will fall within the scope of the present disclosure as well.

Following the initial handshake procedure, the SDN controller engine 304 in the SDN controller device 202/300 may use its communications subsystem 308 to send a "FEATURE REQUEST" message 708 through the management/control connection 208 to the first communications capability SDN switch device 204a/400, and the first communications capability SDN switch engine 404 in the first communications capability SDN switch device 204a/400 may receive that "FEATURE REQUEST" message 708 via its communication subsystem 308. For example, one of skill in the art in possession of the present disclosure would recognize that in the OPENFLOW® protocol, following the establishment of a transport channel (e.g., a Transport Control Protocol (TCP) channel, a Stream Control Transmission Protocol (SCTP) channel, a Transport Layer Security (TLS) channel) between the SDN controller device and an SDN switch device, feature determination may be performed via the sending of a "FeatureReq" (e.g., the "FEATURE REQUEST" message 608) by the SDN controller device to the SDN switch device over that transport channel. That FeatureReq may include an OPENFLOW® header message, with the FeatureReq value set in the type field. However, while a specific example of a feature request message provided in the OPENFLOW® protocol has been provided, other SDN protocols may utilize other types of feature request messages while remaining within the scope of the present disclosure.

For the purposes of the discussions below, the SDN controller device 202 and the second communications capability SDN switch device 206a may also perform an initial handshake procedure that may include or be followed by the SDN controller device 202 providing the second communications capability SDN switch device 206a the feature request message(s) in substantially the same manner as discussed above for the first communications capability SDN switch device 204a. As such, in specific embodiments, the SDN controller device 202 and the second communications capability SDN switch device 206a may exchange "HELLO" messages and "ACKNOWLEDGEMENT" message, and the SDN controller device 202 may send a "FEATURE REQUEST" message to the second communications capability SDN switch device 206a. As discussed above, the initial handshake and feature request may be performed between the SDN controller device 202 and any (and in many embodiments, all) of the SDN switch devices in the SDN network.

The method 600 proceeds to block 604 where the SDN controller device receives feature response message(s) from SDN switch device(s) that include communications capability information about those SDN switch device(s). In an embodiment, at block 602, the SDN controller engine 304 in the SDN controller device 202/300 may receive feature response message(s) through its communication subsystem 308 via the management/control connections 208 from any of the first communications capability SDN switch devices 204a-c and/or the second communications capability SDN switch devices 206a-b to which it sent feature request message(s) at block 602. In the examples below, the SDN controller device 202 is discussed as receiving feature response message(s) from the first communications capability SDN switch device 204a and the second communications capability SDN switch device 206a, but one of skill in the art in possession of the present disclosure will recognize that the SDN controller device 202 may communication at block 604 similarly with any, and in many embodiments will communicate with all, of the first communications capability SDN switch devices 204a-c and/or the second communications capability SDN switch devices 206a-b.

FIG. 7 illustrates how the first communications capability SDN switch engine 404 in the first communications capability SDN switch device 204a/400 may use its communications subsystem 408 to send a "FEATURE RESPONSE" message 710 through the management/control connection 208 to the first communications capability SDN switch device 204a/400, and the SDN switch engine 404 in the first communications capability SDN switch device 204a/400 may receive that "FEATURE RESPONSE" message 710 via its communication subsystem 408. For example, one of skill in the art in possession of the present disclosure would recognize that in the OPENFLOW® protocol, following the receipt of a FeatureReq, SDN switch devices may send a "FeatureRes" to an SDN controller device that enumerates the capabilities of that switch device. Conventionally, a FeatureRes includes a "datapath-id" that may include a 64 bit field that provides a unique identifier for the specific packet processing pipeline being managed), an "n_buffers" field that may identify how many packets the switch can queue when capturing and forwarding packets to the SDN controller device, an "n_tables" field that identifies the number of tables available in the SDN switch device, a "pads" field that may be used to maintain byte alignment, a "capabilities" field that may display general capabilities of the SDN switch device, an "actions" field that may display actions that are supported by the SDN switch device, and a sequence of ports (e.g., in the trailer of the FeatureRes.) The "capabilities" field in a conventional FeatureRes is used to display general capabilities of the SDN switch device such as the ability of the SDN switch device to provide statistics about the SDN switch device on a per table, per flow, per port, per queue, and per group basis, and may also include information about the ability of the SDN switch device to perform IP reassembly, as well as the ability of the SDN switch device to block looping ports. However, one of skill in the art in possession of the present disclosure will recognize that the information included in the "capabilities" fields of a conventional FeatureRes may be clearly distinguished from the communication capabilities information, discussed below, provided according to the teachings of the present disclosure.

However, the feature response message of the present disclosure includes a communications capability field that allows the SDN switch devices to convey their communications capability to the SDN controller. In a specific example, the "FEATURE RESPONSE" message 710 may include the following:

```
struct ofp_switch_features
{
struct ofp_header header;
uint64_t datapath_id;
uint32_t n_buffers;
```

```
uint32_t n_tables;
uint32_t n_pps;
}
```

Figure 8:
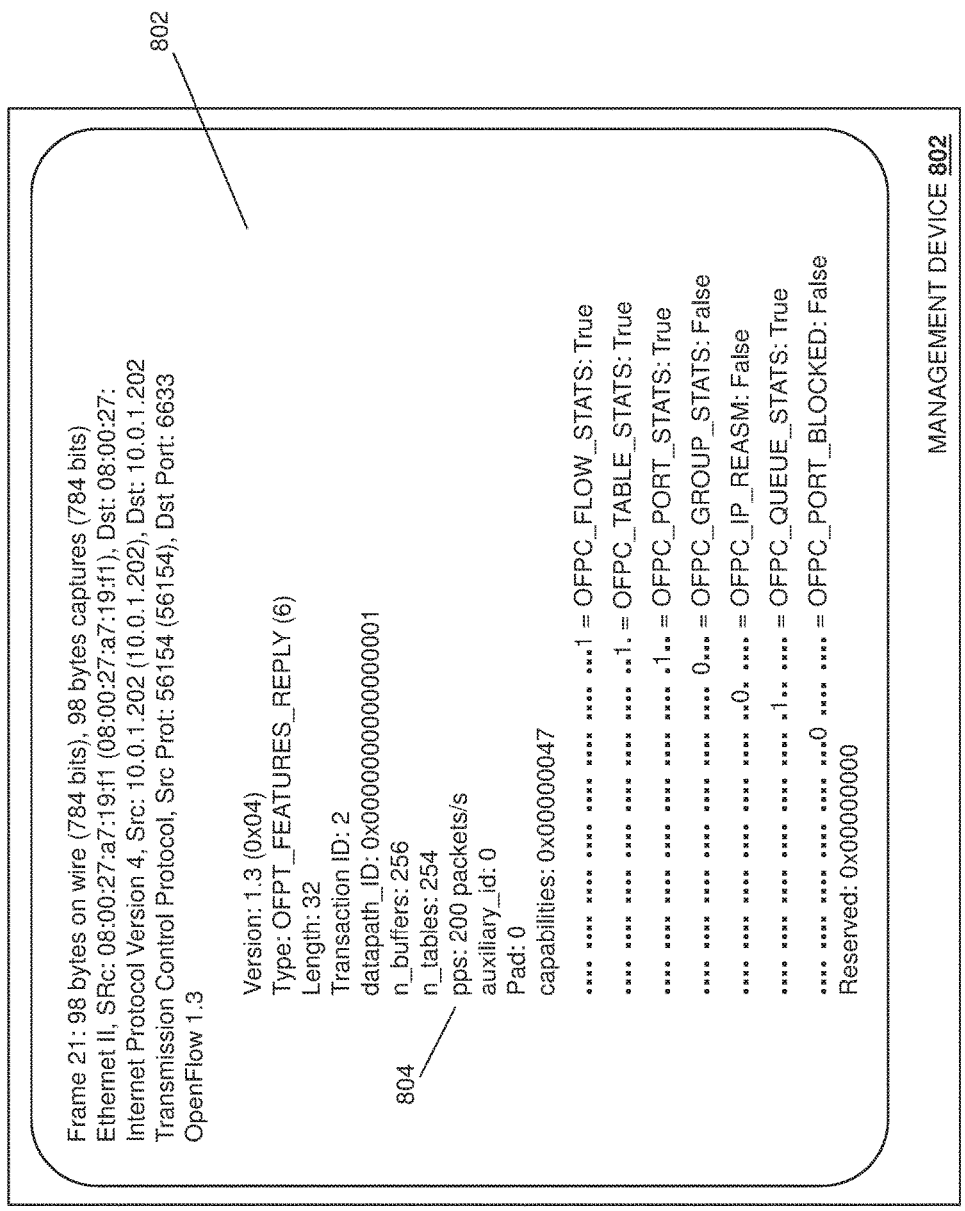
FIG. 8 is a screen shot illustrating an embodiment of a communication capability reporting screen provided for display on a management device.

In the specific example provided above, the portion "uint32_t n_pps;" of the "FEATURE RESPONSE" message 710 is provided to convey a packet processing speed (i.e., "pps") of the SDN switch device. In the examples below, the portion "uint32_t n_pps;" of the "FEATURE RESPONSE" message 710 is used to convey a maximum packet processing speed, an average packet processing speed, and/or other characteristics of the packet processing speed of the SDN switch device. With reference to FIG. 8, a management device 800 (which may be the management device 212 of FIG. 2) is illustrated displaying a communication capability reporting screen 802 that may be provided using information retrieved from the SDN controller device 202. In the illustrated embodiment, the communication capability reporting screen 802 provides an example of information received by the SDN controller device 202 in an OPENFLOW® "FEATURE RESPONSE" message 710 that may include information received in FeatureRes elements (e.g., the "datapath-id", "n_buffers" field, "n_tables" field, "pads" field, "capabilities" field, "actions" field, and sequence of ports discussed above), as well as communications capability information 804 provided according to the teachings of the present disclosure (e.g., the maximum packet processing speed (pps) of 200 packets/second in the illustrated embodiment.)

As such, for the purposes of the discussions below, at block 604 the SDN controller device 202 may receive a "FEATURES RESPONSE" message from the first communications capability SDN switch device 204a that identifies a communications capability of the first communications capability SDN switch device 206a (e.g., a maximum packet processing speed of 200 packets/second in the examples below), and a "FEATURES RESPONSE" message from the second communications capability SDN switch device 206a that identifies a communications capability of the second communications capability SDN switch device 206a (e.g., a maximum packet processing speed of 500 packets/second in the examples below). However, while the communications capability of the SDN switch devices of the present disclosure is specifically discussed as indicating the packet processing speed of those SDN switch devices, communications capabilities reported in the "FEATURE RESPONSE" messages of the present disclosure may include information about a bandwidth available to those SDN switch devices (e.g., an average bandwidth, a maximum bandwidth, and/or other characteristics of the bandwidth of the SDN switch device), as well as any communications characteristics resulting from (or derivable from information about) the processing system, the memory system, the storage system, the communications subsystem, and/or any other system or subsystem in the SDN switch device that affects its communications capabilities.

The method 600 proceeds to block 606 where the SDN controller device determines communication capabilities of the SDN switch device(s) using the communications capability information. In an embodiment, at block 606, the SDN controller engine 304 in the SDN controller device 202/300 uses the communications information in the "FEATURE RESPONSE" message 710 received at block 604 to determine communications capabilities of the SDN switch device(s). For example, using the information in the "FEA- TURE RESPONSE" message 710 received from the first communications capability SDN switch device 204*a* ("uint32_t n_pps;" and or any other related information), the SDN controller engine 304 in the SDN switch device 202/300 may reference a table (e.g., in the SDN controller database 306) to determine a packet processing capability of the first communications capability SDN switch device 204*a*. However, methods other than table-referencing may be utilized for determining communications capabilities from a "FEATURE RESPONSE" message while remaining within the scope of the present disclosure.

As such, at block 606, the SDN controller engine 304 may use the communications capability information received from an SDN switch device to determine a maximum packet processing speed of that SDN switch device, an average packet processing speed of that SDN switch device, other packet processing characteristics of that SDN switch device, a maximum bandwidth available to that SDN switch device, an average bandwidth available to that SDN switch device, other bandwidth characteristics of that SDN switch device, a processing system characteristic that affects the communication capabilities of that SDN switch device (e.g., a CPU type, an NPU type, a CPU/NPU channel type. etc.), a memory system characteristic that affects the communication capabilities of that SDN switch device, a storage system characteristic that affects the communication capabilities of that SDN switch device, a communication subsystem characteristic that affects the communication capabilities of that SDN switch device, and/or any other information that is indicative of the communication capabilities of that SDN switch device. Continuing with the example discussed above, at block 606, the SDN controller engine 304 in the SDN controller device 202/300 may determine that the first communications capability SDN switch device 204*a* includes a maximum packet processing speed of 200 packets/second, and that the second communications capability SDN switch device 206*a* includes a maximum packet processing speed of 500 packets/second.

The method 600 proceeds to block 608 where the SDN controller device performs first communications capability action(s) to cause a control result in an SDN switch device with first communications capabilities. In an embodiment, at block 608, the SDN controller engine 304 in the SDN controller device 202/300 performs one or more first communications capability actions to cause a control result in the first communications capability SDN switch device 204*a*. For example, at block 608, the SDN controller engine 304 may, based on the maximum packet processing speed for the first communications capability SDN switch device 204*a* of 200 packets/second, perform first communications capability action(s) that configure a buffer associated with the first communications capability SDN switch device 204*a* with a first size that causes a control result that includes preventing the SDN controller device from being throttled with respect to communications with the first communications capability SDN switch device 204*a*, and/or preventing the first communications capability SDN switch device 204*a* from dropping packets sent by the SDN controller device 202. In a specific example, a link connecting the SDN controller device 202 with the first communications capability SDN switch device 204*a* may be associated with a TCP socket buffer and, at block 608, the SDN controller engine 304 may configure that TCP socket buffer such that the TCP congestion window size is optimized based on the maximum packet processing speed for the first communications capability SDN switch device 204*a* (e.g., 200 packets/second) to allow the SDN switch device to process any management and/or control commands sent by the SDN controller device 202.

As would be understood by one of skill in the art in possession of the present disclosure, to achieve maximum throughput in SDN controller device/SDN switch device communications, correctly configured TCP socket buffer sizes are critical, as if the TCP socket buffer is configured too small for the packet processing speed of the SDN switch device, the TCP congestion window will never open up fully and the SDN controller device communications will be throttled. However, if the TCP buffers sizes are configured too large for the packet processing speed of the SDN switch device, the SDN controller device communications can overrun the SDN switch device (i.e., because the SDN controller device is sending packets at a faster rate than the SDN switch device can process them), causing the SDN switch device to drop packets and the TCP congestion window to shut down. As such, first communications capability action(s) performed by the SDN controller engine 304 in the SDN controller device 202/300 may ensure that SDN controller device 202/first communications capability SDN switch device 204*a* communications are optimized based on the maximum packet processing speed of the first communications capability SDN switch device 204*a* such that the SDN controller device 202 is not throttled, but also does not send packets at a faster rate than the first communications capability SDN switch device 204*a* can process them.

In another embodiment, at block 608, the SDN controller engine 304 may, based on the maximum packet processing speed for the first communications capability SDN switch device 204*a* of 200 packets/second, perform first communications capability action(s) that chunk flow messages into a plurality of flow message chunks, and send the plurality of flow message chunks to the first communications capability SDN switch device 204*a*. Furthermore, the SDN controller engine 304 may also perform first communications capability action(s) that send the first communications capability SDN switch device 204*a* request(s) to complete processing of a previously received flow message chunk between the sending of each of the plurality of flow message chunks. As would be understood by one of skill in the art in possession of the present disclosure, the OPENFLOW® protocol provides for SDN-controller-device-to-SDN-switch-device Barrier Request messages (e.g., OFPT_BARRIER_REQUEST messages), which are used by SDN controller devices to request that SDN switch devices complete the processing of all messages sent before the Barrier Request message before processing any messages sent after the Barrier Request message. For example, SDN controller devices may push flow modifications to SDN switch devices, and then follow the pushing of those flow modifications by sending a Barrier Request message to the SDN switch device to ensure that the SDN switch device processes all message dependencies and sends all associated notifications for any completed operations before proceeding with processing new messages. Upon receiving the Barrier Request message, the SDN switch device will process each of the previously received flow modifications, and then reply to the Barrier Request message to inform the SDN controller switch that all of the flow modifications have been processed.

However, in the systems and methods of the present disclosure, the SDN controller engine 304 may perform first communications capability action(s) that include chunking flow messages into a plurality of flow message chunks based on the maximum packet processing speed of the first communications capability SDN switch device 204*a* (e.g., 200 packets/second), and then interlacing Barrier Request messages between those flow message chunks (e.g., sending a Barrier Request message to the first communications capability SDN switch device 204a after the sending of each flow message chunk) such that the first communications capability SDN switch device 204a processes the flow message(s) included in each flow message chunk without dropping any flow messages. As such, first communications capability action(s) performed by the SDN controller device 202 may include chunking flow modification messages into chunks of any size based on the communications capabilities of the first communications capability SDN switch device 204a, and sending Barrier Request messages sent after each chunk to provide a control result that includes the first communications capability SDN switch engine 404 in that first communications capability SDN switch device 204a processes flow modification message(s) without dropping any flow modifications messages sent (or to-be-sent) by the SDN controller device 202.

In another embodiment, at block 608, the SDN controller engine 304 may, based on the maximum packet processing speed for the first communications capability SDN switch device 204a of 200 packets/second, perform first communications capability action(s) that include sending keep alive packets at a first frequency. For example, SDN controller devices may maintain a connection with SDN switch devices by sending ECHO packets to the SDN switch devices, and expecting subsequent responses from those SDN switch devices within a predetermined time period. In SDN switch devices with relatively low packet processing capabilities, the sending of ECHO packets to such SDN switch devices can result in the SDN controller device dropping the connection with the SDN switch device because the SDN switch device cannot process that ECHO packet and send the request within the predetermined amount of time. As such, at block 608 the SDN controller engine 304 may perform first communication capability action(s) that reduce the frequency of the sending of ECHO packets to the first communications capability SDN switch device 204a based on its relatively low communications capabilities, thus providing a control result of reducing or eliminating dropped connections between the SDN controller device 202 and the first communications capability SDN switch device 204a.

While a plurality of different examples of first communications capability actions and corresponding control results have been described, one of skill in the art in possession of the present disclosure will recognize that a variety of other first communications capability actions may be performed by the SDN controller device 202 based on the communications capabilities of the first communications capability SDN switch device 204a while remaining within the scope of the present disclosure. As such, the discussion of first communications capability actions and corresponding control results above should not be interpreted as limiting the systems and methods of the present disclosure to only those first communications capability actions and/or corresponding control results.

The method 600 proceeds to block 610 where the SDN controller device causes the control result in an SDN switch device with second communications capabilities without performing the first communications capability action(s). In an embodiment, at block 610, the SDN controller engine 304 in the SDN controller device 202/300 causes the control result in the first communications capability SDN switch device 204a without performing the one or more first communications capability actions discussed above. In an embodiment, at block 608, the SDN controller engine 304 may, based on the maximum packet processing speed for the second communications capability SDN switch device 206a of 500 packets/second, cause the control result that includes preventing the SDN controller device from being throttled with respect to communications with the second communications capability SDN switch device 206a, and/or preventing the second communications capability SDN switch device 206a from dropping packets sent by the SDN controller device 202, without configuring a buffer associated with the second communications capability SDN switch device 206a with the first size discussed above. For example, the second communications capability of the second communications capability SDN switch device 206a may ensure that the SDN controller device 202 is not throttled, and does not send packets at a faster rate than the first communications capability SDN switch device 204a can process them, without a need to configure the TCP socket buffer for the link between the SDN controller device 202 and the second communications capability SDN switch device 206a. While an example of a second communications capability SDN switch device 206a that includes a relatively high communications capability (i.e., a fast enough packet processing speed to handle any communications sent by the SDN controller device 202) has been described, one of skill in the art will recognize that the SDN controller device 202 may also configure a buffer associated with the second communications capability SDN switch device 206a with a second size that is different than the first size (i.e., that is utilized for the buffer associated with the first communications capability SDN switch device 204a as discussed above) based on the second communications capabilities of the second communications capability SDN switch device 206a. As such, buffers associated with any SDN switch device in the SDN network fabric may be configured with various sizes that optimize them for communication between that SDN switch device and the SDN controller device.

In another embodiment, at block 608, the SDN controller engine 304 may, based on the maximum packet processing speed for the second communications capability SDN switch device 206a of 500 packets/second, provide the control result that includes the second communications capability SDN switch engine 504 in that second communications capability SDN switch device 205a processing flow modification message(s) without dropping any flow modifications messages sent (or to-be-sent) by the SDN controller device 202, without chunking flow modification messages into chunks based on the communications capabilities of the first communications capability SDN switch device 204a, and sending Barrier Request messages after each chunk. While an example of a second communications capability SDN switch device 206a that includes a relatively high communications capability (i.e., a fast enough packet processing speed to handle any communications sent by the SDN controller device 202) has been described, one of skill in the art will recognize that the SDN controller device 202 may also chunk flow messages into differently sized chunks (i.e., relative to the chunking performed for the first communications capability SDN switch device 204a) based on the communications capabilities of the second communications capability SDN switch device 206a, and sending Barrier Request messages after each chunk. As such, flow messages sent to different SDN switch devices in the SDN network fabric may be chunked differently depending on the different communications capabilities of those SDN switch devices.

In another embodiment, at block 608, the SDN controller engine 304 may, based on the maximum packet processing speed for the second communications capability SDN switch device 204a of 500 packets/second, provide the control result of reducing or eliminating dropped connections between the SDN controller device 202 and the second communications capability SDN switch device 206a without reducing the frequency of the sending of ECHO packets to the second communications capability SDN switch device 206a. While an example of a second communications capability SDN switch device 206a that includes a relatively high communications capability (i.e., a fast enough packet processing speed to handle any communications sent by the SDN controller device 202) has been described, one of skill in the art will recognize that the SDN controller device 202 may also modify the frequency of keep alive packets sent to the second communications capability SDN switch device 206a differently than was done for the first communications capability SDN switch device 204a (e.g., a second frequency that is different than the first frequency discussed above.) As such, keep alive packets may be sent to different SDN switch devices in the SDN network fabric at differing frequencies depending on the different communications capabilities of those SDN switch devices.

Thus, embodiments of the systems and methods described herein provide for the exchange of packet processing capabilities of OPENFLOW® switch devices with OPENFLOW® controller device(s) to allow the OPENFLOW® controller device(s) to modify their communications with each OPENFLOW® switch device based on those packet processing capabilities. As such OPENFLOW® controller devices can limit the number of packets sent to OPENFLOW® switch devices based on the packet processing capabilities of those OPENFLOW® switch devices, send fewer ECHO packets to OPENFLOW® switch devices based on the packet processing capabilities of those OPENFLOW® switch devices, configure the size of TCP socket buffers for links to OPENFLOW® switch devices to provide optimal TCP congestion window sizes for OPENFLOW® switch devices based on the packet processing capabilities of those OPENFLOW® switch devices, "chunk" flow messages into flow message chunks and send Barrier Request messages between flow message chunks based on the packet processing capabilities of those OPENFLOW® switch devices, and/or perform other functionality that would be apparent to one of skill in the art in possession of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A communications-capability-based Software Defined Networking (SDN) control system, comprising:
 a first communication capability Software Defined Networking (SDN) switch device;
 a second communication capability SDN switch device that is coupled to the first communication capability SDN switch device; and
 an SDN controller device that is coupled to each of the first communication capability SDN switch device and the second communication capability SDN switch device, wherein the SDN controller device is configured to:

send, to the first communication capability SDN switch device, a first SDN protocol communication including a first feature request message;
 receive, from the first communication capability SDN switch device, a second SDN protocol communication including a first feature response message having first communications capability information about the first communication capability SDN switch device;
 determine, using the first communication capability information, a first communication capability of the first communication capability SDN switch device;
 perform, based on the first communication capability determined for the first communication capability SDN switch device, at least one first communication capability action to cause a control result in the first communication capability SDN switch device; and
 cause the control result in the second communication capability SDN switch device without performing the at least one first communication capability action in the second communication capability SDN switch device.

2. The system of claim 1, wherein the performing the at least one first communication capability action based on the first communication capability determined for the first communication capability SDN switch device includes:
 configuring, based on the first communication capability determined for the first communication capability SDN switch device, a buffer in the first communication capability SDN switch device to have a first size.

3. The system of claim 1, wherein the performing the at least one first communication capability action based on the first communication capability determined for the first communication capability SDN switch device includes:
 chunking, based on the first communication capability determined for the first communication capability SDN switch device, flow messages into a plurality of flow message chunks; and
 sending the plurality of flow message chunks to the first communication capability SDN switch device.

4. The system of claim 3, wherein the performing the at least one first communication capability action based on the first communication capability determined for the first communication capability SDN switch device includes:
 sending, to the first communication capability SDN switch device based on the first communication capability determined for the first communication capability SDN switch device, a request to complete processing of a previously received flow message chunk between the sending of each of the plurality of flow message chunks.

5. The system of claim 1, wherein the performing the at least one first communication capability action based on the first communication capability determined for the first communication capability SDN switch device includes:
 sending, to the first communication capability SDN switch device based on the first communication capability determined for the first communication capability SDN switch device, keep alive packets at a first frequency.

6. The system of claim 1, wherein the first communications capability information about the first communication capability SDN switch device includes a number of packets the first communication capability SDN switch device is capable of processing per unit of time.

7. The system of claim 1, wherein the SDN controller device is configured to:

send, to the second communication capability SDN switch device, a third SDN protocol communication including a second feature request message;

receive, from the second communication capability SDN switch device, a fourth SDN protocol communication including a second feature response message having second communications capability information about the second communication capability SDN switch device; and determine, using the second communication capability information, a second communication capability of the second communication capability SDN switch device that is higher than the first communication capability of the first communication capability SDN switch device.

8. An Information Handling System (IHS), comprising:
a communication subsystem;
a processing system that is coupled to the communication subsystem; and
a memory system that is coupled to the processing system and that includes instructions that, when executed by the processing system, cause the processing system to provide a Software Defined Networking (SDN) controller engine that is configured to:
send, through the communication subsystem to a first communication capability SDN switch device, a first SDN protocol communication including a first feature request message;
receive, through the communication subsystem from the first communication capability SDN switch device, a second SDN protocol communication including a first feature response message having first communications capability information about the first communication capability SDN switch device;
determine, using the first communication capability information, a first communication capability of the first communication capability SDN switch device;
perform, based on the first communication capability determined for the first communication capability SDN switch device, at least one first communication capability action to cause a control result in the first communication capability SDN switch device; and
cause the control result in a second communication capability SDN switch device that is different than the first communication capability SDN switch device without performing the at least one first communication capability action in the second communication capability SDN switch device.

9. The IHS of claim 8, wherein the performing the at least one first communication capability action based on the first communication capability determined for the first communication capability SDN switch device includes:
configuring, based on the first communication capability determined for the first communication capability SDN switch device, a buffer in the first communication capability SDN switch device to have a first size.

10. The IHS of claim 8, wherein the performing the at least one first communication capability action based on the first communication capability determined for the first communication capability SDN switch device includes:
chunking, based on the first communication capability determined for the first communication capability SDN switch device, flow messages into a plurality of flow message chunks; and
sending, through the communication subsystem to the first communication capability SDN switch device based on the first communication capability determined for the first communication capability SDN switch device, a request to complete processing of a previously received flow message chunk between the sending of each of the plurality of flow message chunks.

11. The IHS of claim 8, wherein the performing the at least one first communication capability action based on the first communication capability determined for the first communication capability SDN switch device includes:
sending, through the communication subsystem to the first communication capability SDN switch device based on the first communication capability determined for the first communication capability SDN switch device, keep alive packets at a first frequency.

12. The IHS of claim 8, wherein the first communications capability information about the first communication capability SDN switch device includes a number of packets the first communication capability SDN switch device is capable of processing per unit of time.

13. The IHS of claim 8, wherein the SDN controller engine is configured to:
send, through the communication subsystem to the second communication capability SDN switch device, a third SDN protocol communication including a second feature request message;
receive, through the communication subsystem from the second communication capability SDN switch device, a fourth SDN protocol communication including a second feature response message having second communications capability information about the second communication capability SDN switch device; and
determine, using the second communication capability information, a second communication capability of the second communication capability SDN switch device that is higher than the first communication capability of the first communication capability SDN switch device.

14. A method for controlling a Software Defined Networking (SDN) network based on SDN switch device communication capability, comprising:
sending, by a Software Defined Networking (SDN) controller device to a first communication capability SDN switch device, a first SDN protocol communication including a first feature request message;
receiving, by the SDN controller device from the first communication capability SDN switch device, a second SDN protocol communication including a first feature response message having first communications capability information about the first communication capability SDN switch device;
determining, by the SDN controller device using the first communication capability information, a first communication capability of the first communication capability SDN switch device;
performing, by the SDN controller device based on the first communication capability determined for the first communication capability SDN switch device, at least one first communication capability action to cause a control result in the first communication capability SDN switch device; and
causing, by the SDN controller device, the control result in a second communication capability SDN switch device that is different than the first communication capability SDN switch device without performing the at least one first communication capability action in the second communication capability SDN switch device.

15. The method of claim 14, wherein the performing the at least one first communication capability action based on the first communication capability determined for the first communication capability SDN switch device includes:

configuring, by the SDN controller device based on the first communication capability determined for the first communication capability SDN switch device, a buffer in the first communication capability SDN switch device to have a first size.

16. The method of claim 14, wherein the performing the at least one first communication capability action based on the first communication capability determined for the first communication capability SDN switch device includes:

chunking, by the SDN controller device based on the first communication capability determined for the first communication capability SDN switch device, flow messages into a plurality of flow message chunks; and sending, by the SDN controller device, the plurality of flow message chunks to the first communication capability SDN switch device.

17. The method of claim 16, wherein the performing the at least one first communication capability action based on the first communication capability determined for the first communication capability SDN switch device includes:

sending, by the SDN controller device to the first communication capability SDN switch device based on the first communication capability determined for the first communication capability SDN switch device, a request to complete processing of a previously received flow message chunk between the sending of each of the plurality of flow message chunks.

18. The method of claim 14, wherein the performing the at least one first communication capability action based on the first communication capability determined for the first communication capability SDN switch device includes:

sending, by the SDN controller device to the first communication capability SDN switch device based on the first communication capability determined for the first communication capability SDN switch device, keep alive packets at a first frequency.

19. The method of claim 14, wherein the first communications capability information about the first communication capability SDN switch device includes a number of packets the first communication capability SDN switch device is capable of processing per unit of time.

20. The method of claim 14, further comprising:

sending, by the SDN controller device to the second communication capability SDN switch device, a third SDN protocol communication including a second feature request message;

receiving, by the SDN controller device from the second communication capability SDN switch device, a fourth SDN protocol communication including a second feature response message having second communications capability information about the second communication capability SDN switch device; and determining, by the SDN controller device using the second communication capability information, a second communication capability of the second communication capability SDN switch device that is higher than the first communication capability of the first communication capability SDN switch device.

* * * * *